Aug. 28, 1951  E. O. COLLISON ET AL  2,565,720
WASTE DISPOSAL DEVICE FOR AIRCRAFT
Filed Oct. 10, 1949  2 Sheets-Sheet 1
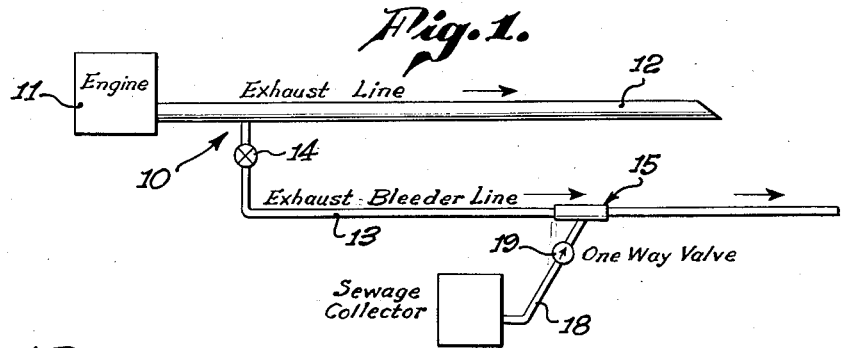
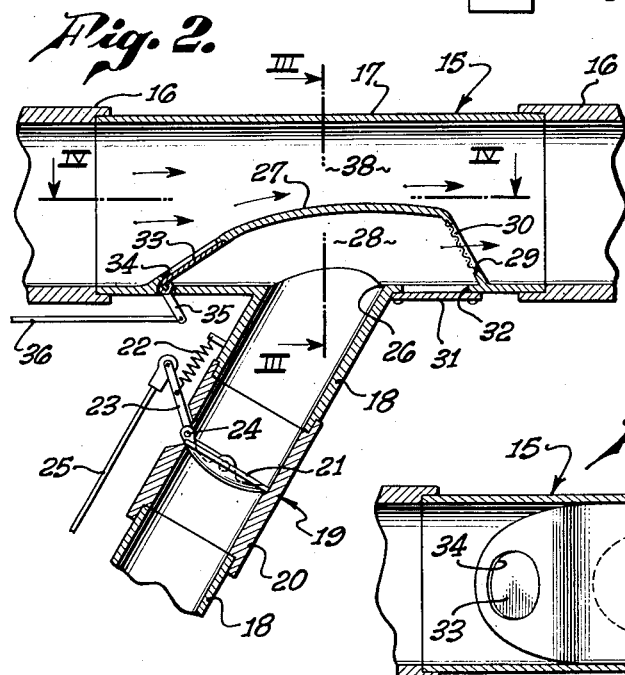
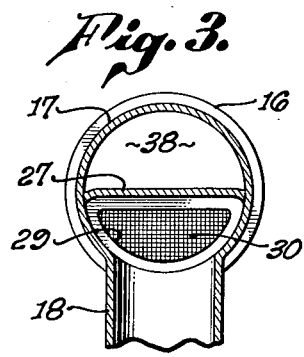
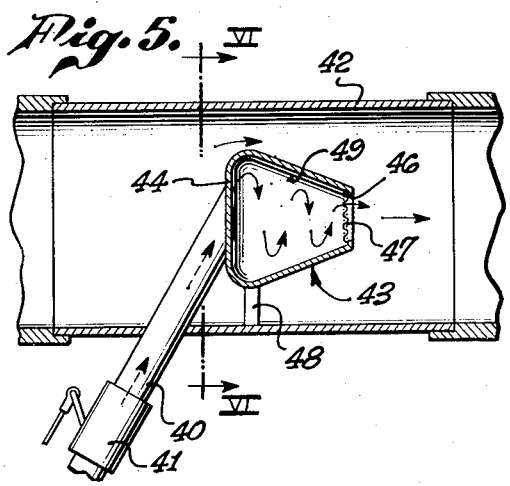
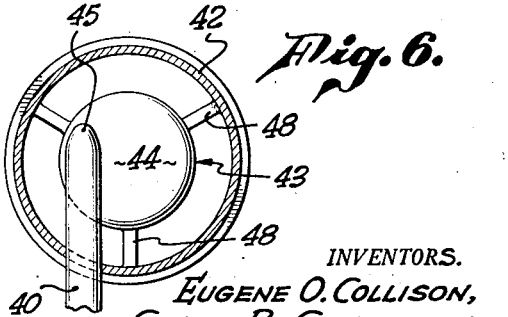
INVENTORS.
EUGENE O. COLLISON,
CLARK B. GATHERCOLE,
ATTORNEY.

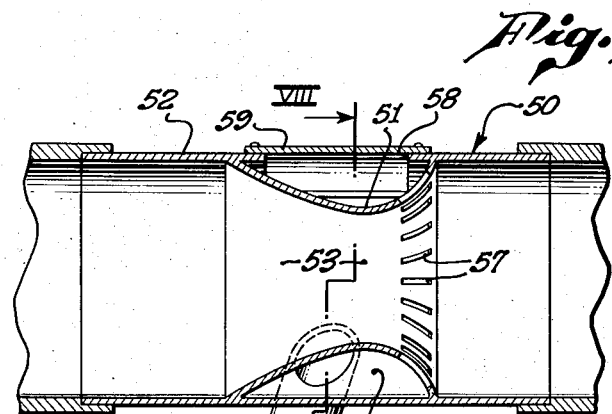
Fig. 7.
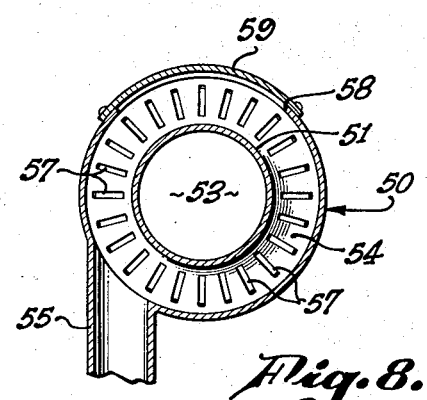
Fig. 8.
Fig. 9.
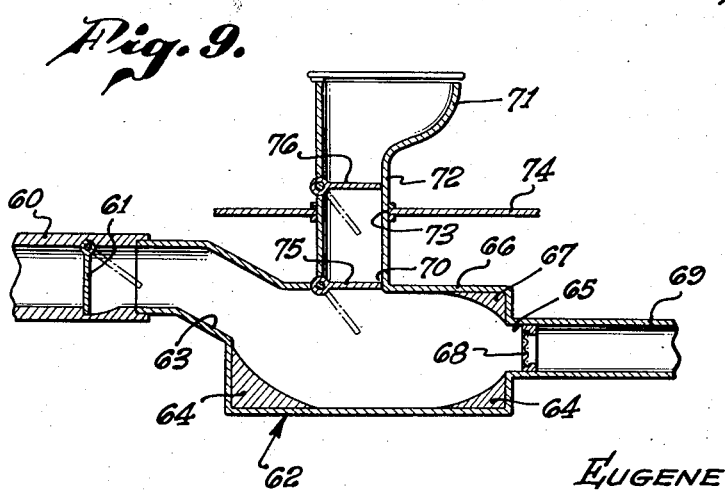
INVENTORS.
EUGENE O. COLLISON,
CLARK B. GATHERCOLE,
ATTORNEY.

Patented Aug. 28, 1951

2,565,720

UNITED STATES PATENT OFFICE 2,565,720

WASTE DISPOSAL DEVICE FOR AIRCRAFT

Eugene O. Collison, Rosemead, and Clark B. Gathercole, Temple City, Calif.

Application October 10, 1949, Serial No. 120,556

12 Claims. (Cl. 4—131)

This invention relates to an improved device and method for disposing of sewage, waste or refuse in an aircraft while in flight and in particular to an improved disposal device utilizing heat and pressure sources on an aircraft for calcining and dissipating the sewage and waste.

Sewage disposal on aircrafts while in flight is usually provided by containers in which the sewage is chemically treated to eliminate objectionable odors. These containers are usually removed and emptied while the aircraft is being serviced upon the ground after a flight has been made. Such a method of disposing of sewage, waste or refuse accumulated while an aircraft is in flight is unsatisfactory in that the containers have limited capacity, that during rough flying weather the contents of the container may spill over onto the adjacent floor and the containers may become a source of unpleasant odors in the lavatory. Disposal of refuse from meals served on an aircraft while in flight is usually handled in somewhat the same manner, except that they may not be placed in containers for chemical treatment during the flight.

The primary object of this invention is to design and provide an improved device for immediate disposal of collected sewage, waste or refuse while an aircraft is in flight by utilizing heat and pressure sources in an aircraft for calcining the sewage and dissipating the products of calcination into the atmosphere in relatively finely divided particles.

An object of this invention is to provide an improved waste disposal device for aircraft in flight by calcining such waste and breaking the products of calcination into finely divided particles which will be discharged into the atmosphere in a sterile, germ-free and sanitary condition.

Another object of this invention is to design and provide an improved waste disposal device utilizing engine exhaust gases on an aircraft in flight wherein the exhaust gases are employed to aspirate the waste material into a calcining or incinerating chamber.

A further object of this invention is to provide a waste disposal device for use on aircraft in flight wherein exhaust gases of an engine are utilized to provide heat required to oxidize the waste material, and the flow of the exhaust gases is employed to create a pressure differential for aspirating waste material into a calcining chamber and then out of the calcining chamber for dispersion in the atmosphere.

Still another object of this invention is to provide an improved waste disposal device for use on aircraft while in flight wherein the waste material is subjected to a calcining action in a chamber forming part of the exhaust system and wherein means are provided for causing the calcined material to break up into finely divided particles for a secondary oxidizing action in the exhaust system before discharge into the atmosphere.

Generally speaking the method of disposing of sewage contemplated by this invention includes conducting a stream of hot exhaust gases from an engine of an aircraft past a calcination zone, transmitting heat from the gases to the calcination zone, reducing the pressure of the gas stream adjacent the calcination zone to aspirate sewage into said zone, and then discharging the calcined sewage and products of calcination from the zone into the stream of exhaust gases.

Another object of this invention is to provide a novel method of disposing of sewage on aircraft wherein the stream of hot exhaust gases from an aircraft engine may be utilized for purging the calcining zone wherein the sewage is calcined.

Other objects and advantages of this invention will be readily apparent to those skilled in the art.

In the drawings:

Fig. 1 is a diagrammatic line sketch showing an exhaust system embodying this novel sewage disposal device.

Fig. 2 is a fragmentary, sectional view through a device embodying this invention, the section being taken in a transverse longitudinally extending plane bisecting the exhaust line.

Fig. 3 is a fragmentary, transverse sectional view taken in the plane indicated by the line III—III of Fig. 2.

Fig. 4 is a fragmentary sectional view taken in a longitudinally extending, transverse plane indicated by the line IV—IV of Fig. 2.

Fig. 5 is a fragmentary, sectional view taken in a longitudinally extending, transverse plane bisecting a different modification of this invention.

Fig. 6 is a fragmentary, transverse sectional view taken in the plane indicated by the line VI—VI of Fig. 5.

Fig. 7 is a fragmentary, sectional view of a device embodying a different modification of this invention.

Fig. 8 is a fragmentary, transverse, sectional view taken in the planes indicated by line VIII—VIII of Fig. 7.

Fig. 9 is a sectional view of a different modification of this invention, the section being taken in a vertical plane bisecting the axis of the device.

Referring particularly to the diagrammatic sketch shown in Fig. 1, an exhaust system, generally indicated by 10, is illustrated which may be utilized in connection with the improved sewage disposal device. The heat and pressure fluid means used to move and calcine sewage sludge collected on an aircraft in flight is provided by the exhaust gases of one or more engines 11 on the aircraft. In a radial type engine the collector ring for the exhaust gases may be modified so as to provide a primary exhaust line 12 for discharging the exhaust gases when the device is not in use. This exhaust line may be tapped by an exhaust bleeder line 13 and if desired the entire exhaust gases from the engine may be directed through the bleeder line. As indicated, a valve 14 may be provided in the exhaust bleeder line adjacent the primary exhaust line.

Adjacent the rear of the aircraft the exhaust bleeder line may be provided with the improved sewage disposal device generally indicated by 15 contemplated by this invention. This device is connected by suitable piping to a sewage collector (not shown) usually located in the rear portion of the fuselage.

In the embodiment of this improved disposal device shown in Figs. 2, 3 and 4, the device is illustrated as being installed in the exhaust bleeder line at a suitable point along its length by means of any suitable couplings 16. The disposal device 15 comprises an elongated duct 17 of substantially the same internal diameter as that of the exhaust line and is adapted to permit passage therethrough of exhaust gases. Connected to and joining said duct at a suitable angle to its longitudinal axis is a sewage-carrying duct 18 which may be suitably connected at its other end to and in communication with a sewage collector of any suitable form (not shown).

Adjacent the exhaust gas-carrying duct 17, the sewage-carrying duct 18 may be provided with a one-way spring-biased flow valve 19 of any suitable type and manufacture. The one-way flow valve permits flow of sewage toward the exhaust gas duct and prevents flow of sewage or passage of gases from the exhaust duct toward the sewage collector. The valve may comprise a valve body 20 of somewhat greater outer diameter than the sewage-carrying duct 18 and having pivotally mounted therein a flap valve element 21. The valve body may be provided with an annular shoulder surrounding a valve port against which the marginal edges of the valve element 21 may seat when in closed position. If desired, the valve element may be provided with an axially mounted, virtually half spherical member of suitable rubber composition material affording a self-adjusting centering valve element. The valve element may be spring-biased by spring 22 so as to hold said valve 19 in closed position against pressure of any sewage in the sewage-carrying duct 18 and also against any suction from the passage of exhaust gases through the exhaust-carrying duct 17. The valve may be actuated by means of a bell crank lever arm 23 connected to the pivot pin 24 of the valve element and at its outer end may be provided with a suitable connection to a cable 25 or other manually actuatable means for opening and closing the valve element 21.

The sewage-carrying duct 18 is provided with an open end 26 for discharging sewage sludge into the exhaust gas-carrying duct. Surrounding this opening is a housing provided by a partition wall 27 secured to the inner wall surface of the gas-carrying duct and disposed in a longitudinally extending plane passing through said duct preferably spaced not more than ⅓ the diameter of the duct from end 26. The wall 27 defines calcining chamber 28 and a restricted passageway 38 in the gas-carrying duct, said wall 27 presenting a surface aero-dynamically curved to produce smooth flow of gases into the restricted passageway 38 and to provide a vacuum zone suitably located on the downstream side of the passageway.

The wall 27 may be formed from a single, flat sheet of metal outwardly bent at its opposite ends and having a generally oval-shaped periphery for welding its edges to the inner cylindrical surface of the gas-carrying duct. The partition wall is preferably made of a metal having a high coefficient of heat transfer so that heat from the exhaust gases passing through the gas-carrying duct will provide a hot inner surface on the wall for creating an intense heat within the incinerator chamber 28.

The downstream or bottom bent end of wall 27 may be provided with a discharge port 29 of generally semi-circular form. Port 29 may obviously be of any different shape, such as circular, if desired.

Extending across the discharge port 29 may be provided a screen 30 of any suitable size of mesh for the purpose of breaking up ash particles as they are sucked from the incinerator chamber into the gas-carrying duct 17. If desired, the screen 30 may include a grid element of larger mesh in order to initially reduce size of possible conglomerate ash particles.

Adjacent the discharge port 29 and below the sewage-carrying duct outlet 26 may be provided a clean-out plate 31 suitably secured to the wall of the gas-carrying duct 17 as by screws removably covering a clean-out opening 32 in the wall of the gas-carrying duct 17. In the event foreign matter is passed through the sewage-carrying duct 18 and the foreign mater is not readily burnable or subject to calcination, such matter may be removed from the incinerator chamber through the clean-out opening 32.

A purging valve 33 may be provided at the upstream or top bent end of wall 27 for covering a valve port 34 formed in said wall 27. The valve 33 may be a flap-type valve of any suitable form operable by a bell crank lever arm 35 connected to a suitable linkage or cable 36. The valve 33 is spring-biased to closed position so that it is normally held in closed position for withstanding pressures prroduced in the upstream end of the gas-carrying duct 17. Valve 33 may be manually operated and adjusted for reduction of back-pressures which may be created in the upstream end of duct 17 because of the restricted passageway formed by the housing 27. Valve 33 is also operable to be opened for permitting virtually direct flow of the hot exhaust gases through the incinerator chamber for purging the chamber of any calcined or partially burned matter therein.

Preferably, operation of the sewage disposal device 15 is controlled by an attendant on the aircraft, although this invention also contemplates that suitable valve arrangements may be provided so that the sewage disposal device could be operable by passengers on the aircraft. In the arrangement illustrated it is contemplated that an attendant would first open valve 14 in the exhaust bleeder line to permit exhaust gases to flow through said line. Obviously, it may be undesirable to have such exhaust gases passing through the line continuously and when the disposal device is not in use.

After valve 14 has been opened, valve 19 may be opened by the attendant in order to permit flow of sewage collected above valve 19 into the incinerator chamber. The sewage flow may be initially aided by flushing the sewage with a small quantity of water, but primarily the sewage flow will be produced by a vacuum produced on the downstream side of housing 27 by reason of the restricted gas passageway in the gas-carrying duct 17. The restricted passageway produces a pressure differential between the interior of the incinerator chamber and the portion of the gas-carrying duct downstream from the discharge port 29. Thus the flow of gases through the duct 17 tends to suck or aspirate any material carried in the sewage-carrying duct 18 into the incinerator chamber for calcination.

As sewage is introduced into the incinerator chamber from the sewage-carrying duct, it impinges against the intensely hot internal surface of wall 27 and is substantially, instantaneously calcined and cremated. The instantaneous calcination of the sewage produces steam in the incinerator chamber which affords additional pressure for forcibly ejecting the products of calcination through the discharge port 29. It should be noted that in this operation valve 19 is closed, spring 22 being of sufficient strength so as to resist opening of the valve by the suction of the exhaust gases.

Since sewage contains an extremely high percentage of water, as for example 90–95%, only a relatively small quantity of ash remains after calcination.

The forcible ejection of the ash through the discharge port 29 and screen 30 breaks up any conglomerate ash particles into finely divided particles. In the event particles of sewage pass through the screen 30 in a partially unburned state, these particles will be further subjected to cremation by the hot exhaust gases in the downstream portion of the exhaust bleeder line. Such particles are subjected to further breaking up and dividing by the turbulent flow of the exhaust gases in the downstream portion of the exhaust line because of the interference of housing 27 with the normal smooth flow of the gases through the gas-carrying duct 17.

By the time the ash particles reach the discharge end of the exhaust line for ejection into the atmosphere the particles will be completely dehydrated, calcined, and broken up into finely divided, sterile, sanitary particles which will be readily dispersed and dissipated in the air.

In the modification shown in Figs. 5 and 6, a sewage disposal unit of somewhat different form is illustrated. The sewage-carrying duct 40 includes a one-way flow valve 41 of any suitable type such as disclosed in the prior modification. The sewage-carrying duct extends into the gas-carrying duct 42 at an angle and in a plane parallel to and spaced from a transverse plane passing through the axis of the hot gas-carrying duct.

Centrally supported within the gas-carrying duct is an incinerator or calcining housing 43 of generally frusto-conical form having its widest diameter positioned upstream of the flow of gases. The calcining housing is provided with a top wall 44 having an axially offset port therein adapted for communication with an open end 45 of the sewage-carrying duct 40. The bottom end of the incinerator housing is provided with a discharge outlet 46 having suitable grid and screen elements 47 positioned therein for breaking up the ash particles into finely divided particles. The calcining housing may be supported within the gas-carrying duct by a plurality of circumferentially spaced, transversely extending arms 48 which are secured to the cylindrical wall of the duct in any suitable manner.

In this modification sewage introduced into the calcining chamber 49 is subjected to a spirally directed downward flow through the housing to the discharge outlet. It should be noted that the flow of the introduced sewage is tangential to the frusto-conical wall of the calcining housing and thus the sewage is brought into direct contact with the hot internal wall surface of the housing while flowing spirally downward. It will be readily apparent in this modification that positioning of the incinerator housing axially within the gas-carrying duct permits flow of the hot gases completely around the calcining housing and a maximum area of wall surface on the housing is subjected to the heat of the gases. Since the incinerator housing substantially reduces the transverse cross-sectional area for flow of the hot gases, a Venturi effect is produced which creates a pressure differential resulting in a high gas velocity downstream of the housing acting to aspirate the sewage sludge through the sewage-carrying duct and into and through the calcining chamber.

In the modification shown in Figs. 7 and 8, the sewage disposal device 50 differs from that shown in the previous modifications in that an incinerator housing 51 is provided by a partition wall of hourglass configuration secured as by welding to the inner surfaces of a hot gas-carrying duct 52. The housing provides a central, narrow throat portion 53 in the duct and an annular outer incinerator chamber 54. A sewage-carrying duct 55 is provided with a one-way flow valve 56 as in the previous modifications and is connected to the incinerator chamber at an angle and tangentially so as to provide circumferential flow through the annular incinerator chamber 54. The downstream annular marginal edges of the wall defining the chamber 54 may be slotted in any desired manner so as to provide a grid or securing means for breaking up calcined ash particles. If desired, beneath the grid 57 may be provided a screening unit (not shown) of finer mesh for further dividing the ash particles. A clean-out opening 58 and a cover 59 therefor afford access to the calcining chamber when desired.

In operation of all of the modifications disclosed above the sewage may be permitted to collect in a sewage-carrying duct if desired and then disposed of by one of the aircraft personnel by opening the valve which introduces the hot exhaust gases into an exhaust bleeder line. This invention also contemplates an arrangement whereby disposal of the sewage may be provided by operation of a valve by the occupant of the lavatory in order to produce the flow of sewage in the sewage-carrying duct to the calcining chamber.

In addition to sewage from a lavatory on an aircraft this disposal device may also be utilized to conveniently and readily dispose of garbage or other refuse which is collected during an aircraft flight. When it is desired to dispose of garbage it is preferable to shred and cut up the particles of garbage by any suitable means such as well-known garbage shredding devices. It is also important to note that when the refuse, sewage or garbage is processed by the disposal device described above the ash remaining from the calcining and dehydrating operation is of relatively small quantity because of the large percentage of water carried in such material and it is discharged into the atmosphere in sanitary, sterile, and germ-free, finely divided particles which will be widely dispersed before falling to the earth.

A different modification of this invention is illustrated in Fig. 9. This modification contemplates the calcination of sewage in the immediate vicinity of the aircraft lavatory.

An exhaust gas-carrying duct 60 is connected for communication with the exhaust line in a manner similar to that of the prior modifications. The gas-carrying duct may be provided with a manually operable one-way flap-type valve generally indicated at 61 for controlling and regulating the flow of exhaust gases through the gas-carrying duct. Connected to the duct 60 may be a sewage collector receptacle generally indicated at 62.

Receptacle 62 may be provided with a diagonally upwardly arranged conduit 63 provided at an upper end portion of the receptacle 62 for connection to the gas-carrying duct 60. Receptacle 62 includes a box-like structure provided with an inner heat-resistant lining 64 covering the bottom of the receptacle and having a generally curved surface 65 smoothly joining the lower surface of the diagonal conduit 63. Adjacent the discharge end of the receptacle 62 the heat resistant lining 64 may be also curved upwardly to smoothly direct the flow of gases out of a discharge port 65. The sides of the receptacle 62 are preferably lined with a heat-resistant material (not shown) and the top wall 66 may also be provided with a heat resistant lining 67 having a downwardly curved surface for smoothly directing flow of gases toward the discharge outlet 65, said outlet 65 being formed intermediate the top and bottom walls of the receptacle.

A grid or screening means 68 is provided for the discharge port 65 for the purpose of further breaking up particles of calcination in the same manner as in the prior modifications. The gas-carrying duct 69 may conduct the products of calcination to the atmosphere or, if desired, the duct 69 may be connected with another disposal device of the character described in the previous modifications for further calcination.

The top wall 66 of the receptacle 62 is provided with a sewage inlet 70 connecting the receptacle 62 with a water closet 71 by means of an intermediate sewage-carrying pipe 72, said pipe 72 extending through an opening 73 provided in the floor 74 of the lavatory. The pipe 72 may be provided with a lower spring-biased flap valve 75 disposed in the sewage inlet 70 and operable to permit sewage to fall into the receptacle 62. Adjacent the bottom of the water closet 71 may be provided an upper spring-biased valve 76 of the same type as valve 75 for further closing the sewage pipe 72.

In operation of the modification shown in Fig. 9, sewage from the water closet 71 may be disposed in the receptacle 62 by opening the valves 75 and 76. After a quantity of sewage has been collected in the receptacle 62, an aircraft attendant may open a suitable valve in the exhaust system to provide for passage of hot gases through the gas-carrying duct 60. Opening of valve 61 in the gas-carrying duct provides for a flow of hot gases over the surface of the sewage collected in the calcining chamber provided by the receptacle 62 for reducing the sewage collected therein to ash. As the sewage is calcined by action of the hot gases the products of calcination are discharged through the discharge port 65 and through the screening means 68 for dispersion in the atmosphere. Since the interior of the calcining chamber is provided with a heat resistant lining having smoothly curved surfaces leading to the discharge port complete removal of the calcined sewage will be accomplished by the stream of hot gases flowing therethrough.

It will thus be readily apparent to those skilled in the art that the hot exhaust gases which are conducted to a calcination zone readily transmit heat to the sewage material to be disposed of and not only oxidizes the sewage but also provides a means for discharging the products of calcination into the atmosphere in the form of finely divided, sterile particles of ash.

Other heat and pressure means may be used for operation of the disposal device on an aircraft as for example airborne heating systems utilized for heating aircraft cabins and pressure means associated with said heating systems including the slipstream.

The valves used with the aircraft sewage disposal device, although described as manually operable, may include automatic and semi-automatic valve operation. Such automatic valve operation may be made dependent upon conditions of engine performance, pressure, altitude and various other factors so that operation of the disposal device will not affect engine or heating system performance during flight.

It will be readily understood that the modifications described above are exemplary only and all changes coming within the scope of the appended claims are embraced thereby.

We claim:

1. In a sewage disposal device for use with an exhaust gas system of an aircraft while in flight, the combination of: an exhaust gas-carrying duct adapted to be inserted in an exhaust gas line for passing hot exhaust gases through the duct; a housing within the duct forming a restricted passageway for said gases and defining a calcining chamber, said housing having a metal wall of high heat conductivity between the passageway and chamber for presenting an internal surface within the chamber heated by passage of gases through the duct; a sewage-carrying duct connected to the gas-carrying duct and opening into the chamber for introducing sewage thereto for calcination; a discharge port in the downstream end of the housing below the restricted passageway in the gas-carrying duct; a screen extending across the port for breaking up calcined particles during their discharge through said port; said restricted passageway in the gas-carrying duct producing a pressure differential between the duct below the housing and the incinerator chamber for aspirating sewage through the sewage-carrying duct and the calcining chamber; valve means in the sewage-carrying duct permitting sewage flow towards the calcining chamber; valve means in the upstream end of the housing for relieving back pressure in the gas-carrying duct and for purging the chamber.

2. In a sewage disposal device for use with an exhaust gas system of an aircraft while in flight, the combination of: an exhaust gas-carrying duct adapted to be inserted in an exhaust gas line for passing hot exhaust gases through the duct; a housing within the duct forming a restricted passageway for said gases and defining a calcining chamber, said housing having a metal wall of high heat conductivity between the passageway and chamber for presenting an internal surface within the chamber heated by passage of gases through the duct; a sewage-carrying duct connected to the gas-carrying duct and opening into the chamber for introducing sewage thereto for calcination; a discharge port in the downstream end of the housing below the restricted passageway in the gas-carrying duct; a screen extending across the port for breaking up calcined particles during their discharge through said port; said restricted passageway in the gas-carrying duct producing a pressure differential between the duct below the housing and in the incinerator chamber for aspirating sewage through the sewage-carrying duct and the calcining chamber; and valve means in the sewage-carrying duct permitting sewage flow towards the calcining chamber.

3. In a sewage disposal device for use with an exhaust gas system of an aircraft while in flight, the combination of: an exhaust gas-carrying duct adapted to be inserted in an exhaust gas line for passing hot exhaust gases through the duct; a housing within the duct forming a restricted passageway for said gases and defining a calcining chamber, said housing having a metal wall of high heat conductivity between the passageway and chamber for presenting an internal surface within the chamber heated by passage of gases through the duct; a sewage-carrying duct connected to the gas-carrying duct and opening into the chamber for introducing sewage thereto for calcination; a discharge port in the downstream end of the housing below the restricted passageway in the gas-carrying duct; a screen extending across the port for breaking up calcined particles during their discharge through said port; said restricted passageway in the gas-carrying duct producing a pressure differential between the duct below the housing and the incinerator chamber for aspirating sewage through the sewage-carrying duct and the calcining chamber; and valve means in the upstream end of the housing for relieving back pressure in the gas-carrying duct and for purging the chamber.

4. In a sewage disposal device for use with an exhaust gas system of an aircraft while in flight, the combination of: an exhaust gas-carrying duct adapted to be inserted in an exhaust gas line for passing hot exhaust gases through the duct; a housing within the duct forming a restricted passageway for said gases and defining a calcining chamber, said housing having a metal wall of high heat conductivity between the passageway and chamber for presenting an internal surface within the chamber heated by passage of gases through the duct; a sewage-carrying duct connected to the gas-carrying duct and opening into the chamber for introducing sewage thereto for calcination; a discharge port in the downstream end of the housing below the restricted passageway in the gas-carrying duct; said restricted passageway in the gas-carrying duct producing a pressure differential between the duct below the housing and the incinerator chamber for aspirating sewage through the sewage-carrying duct and the calcining chamber.

5. In an improved waste disposal device adapted to be installed in an exhaust gas system comprising: a duct in communication with an exhaust line for passing exhaust gases through the duct; a calcining chamber excluded from said gases and defined by a housing extending into said duct, said housing having a wall in contact with the hot exhaust gases passing through the duct, said wall presenting a heated surface within the chamber; a waste-carrying duct opening into the chamber for introducing waste therein for calcination; and an outlet in said housing for discharge of the calcined waste into the exhaust gas duct.

6. A device of the character described in claim 5 wherein a valve port is provided in said wall upstream of the waste duct opening, and a valve means is operable for admitting exhaust gases through said port for purging said chamber.

7. A device of the character described in claim 5 wherein screening means extends across said discharge outlet for breaking up particles of calcined waste.

8. A device of the character described in claim 5 wherein said wall forms a restricted passageway in said gas duct for aspirating waste into the calcining chamber.

9. A device of the character described in claim 5 wherein said wall forms a restricted passageway in said gas duct for aspirating waste into the calcining chamber and wherein contact of waste with said heated surface virtually instantaneously produces steam for ejecting under pressure calcined waste from said chamber.

10. In a waste disposal device, the combination of: a hollow duct providing a passageway adapted to be connected in communication with a flow of hot gases for passage therethrough; a housing interposed in the flow of gases in said passageway and providing a calcining chamber excluded from said gases, the upstream end of said chamber being normally closed to the flow of said gases and the downstream end of said housing having an open outlet for discharge of calcined waste; and a valved inlet to said chamber for introducing waste therein, said waste being aspirated into said chamber by flow of gases past said outlet.

11. A device as defined in claim 10 wherein the upstream end of the chamber is provided with a valved port for admitting gases for purging said chamber.

12. A device as defined in claim 10 wherein said housing is of frusto-conical form and said inlet is disposed eccentric to the axis of said housing.

EUGENE "O" COLLISON.
CLARK B. GATHERCOLE.

REFERENCES CITED

The following references are of record in the file of this patent:

UNITED STATES PATENTS

| Number | Name | Date |
|---|---|---|
| 1,818,586 | Schumacher | Aug. 11, 1931 |
| 1,892,132 | Berney | Dec. 27, 1932 |